Dec. 22, 1970     W. J. WILSON ET AL     3,549,319
PRODUCTION OF ALKALI METAL SULFITES OR BISULFITES
Filed May 6, 1968     2 Sheets-Sheet 1

WILLIAM J. WILSON
BEJOY S. DAS
INVENTORS

BY

PATENT AGENT

United States Patent Office 3,549,319
Patented Dec. 22, 1970

3,549,319
PRODUCTION OF ALKALI METAL
SULFITES OR BISULFITES
William J. Wilson, Vancouver, British Columbia, and Bejoy S. Das, Toronto, Ontario, Canada, assignors to Fraser Companies Limited, Edmundston, New Brunswick, Canada
Filed May 6, 1968, Ser. No. 726,792
Int. Cl. C01d 5/14
U.S. Cl. 23—129
24 Claims

ABSTRACT OF THE DISCLOSURE

Alkali metal sulfites and bisulfites are prepared from alkali metal salts of inorganic acids by first reacting an organic carbonyl compound with sulfurous acid to produce the α-hydroxysulfonic acid corresponding to the carbonyl compound. This α-hydroxysulfonic acid is next reacted in aqueous medium with an alkali metal salt of an inorganic acid under such conditions that the alkali metal salt of the α-hydroxysulfonic acid produced is separated from the medium. The alkali metal salt of the α-hydroxysulfonic acid is then separated and decomposed to produce the alkali metal sulfite or bisulfite.

---

This invention relates to the manufacture of alkali metal or ammonium bisulfite or sulfite used extensively as pulping chemicals in paper and related industries. This invention also relates to the manufacture of the same alkali metal or ammonium bisulfite or sulfite which find widespread application in bleaching, dyeing, photography, and in numerous other chemical industries as reducing agents, disinfectants, and preservative chemicals.

In preparing pulp from lignocellulose containing materials such as wood, straw and the like, it is customary to digest or chemically react the lignocellulosic materials to soften or remove from the cellulosic materials, components such as lignins and the like which tend to bind the cellulose fibres together. Subsequent to the removal of these components the fibres may be further treated such as by mechanical disintegration to render them suitable for future use such as in paper making. One of the well known digesting treatments to remove these cellulosic binding components is the sulfite process.

According to the sulfite process for the production of pulp, wood is digested with a solution of an alkaline earth or alkali metal or ammonium sulfite of bisulfite with free sulfur dioxide either together or separately in one or more stages of digestion to dissolve the ligneous materials. Originally, calcium bisulfite was used almost exclusively, because cooking liquors could be prepared cheaply by treating inexpensive limestone with a sulfur dioxide solution. In recent years, calcium has been replaced in many mills by the so-called soluble bases, particularly with sodium or ammonium, because of the advantages of versatility, higher pulp yields, and improved pulp quality. However, more widespread use of the soluble bases is prevented by their high cost and the technical difficulties involved in their recovery. It is obvious, therefore, that an inexpensive source of soluble bases, particularly sodium or ammonium for the manufacture of cooking acid would be a great advantage to the sulfite industry.

At present, only one method of preparing alkali metal or ammonium bisulfite or sulfite is normally practised; and this consists of passing sulfur dioxide gas through a solution of alkali metal hydroxide or ammonium hydroxide or their carbonate as set forth in the following equations:

$$MOH + SO_2 \rightarrow MHSO_3 \qquad (1)$$

$$M_2CO_3 + 2SO_2 + H_2O \rightarrow 2MHSO_3 + CO_2 \qquad (2)$$

where M=alkali metal or ammonium.

The alkali metal or ammonium bisulfite may be converted to the corresponding sulfite by adding more of their carbonate to the bisulfite solution and boiling until all the carbon dioxide gas is evolved.

$$2MHSO_3 + M_2CO_3 \rightarrow 2M_2SO_3 + CO_2 + H_2O \qquad (3)$$

where M=alkali metal or ammonium.

The only disadvantage of the method so described is the high cost of alkali metal hydroxide or ammonium hydroxide or their carbonate used in the process.

As hereinafter employed in the specification the term "alkali metal" is intended to include ammonium.

An inexpensive source of alkali metal lies in the inexhaustible supplies of their salts of strong inorganic acids, notably sodium chloride, sodium sulfate and potassium chloride. By present technology, this inexpensive source of alkali metal connot be used by the pulping industry or other chemical industries because sulfurous acid, being a weaker acid, will not displace the strong acid from combination with the alkali metal base, i.e., the reaction shown in the following Equation 4 proceeds to the left rather than to the right.

$$MX + H_2O + SO_2 \rightleftharpoons MHSO_3 + HX \qquad (4)$$

where:
M=alkali metal
HX=strong acid.

It is, therefore, a principal object of this invention to provide a method of preparing alkali metal sulfites or bisulfites from cheap sources of alkali metal.

Another object of this invention is to provide a method for economically and efficiently preparing alkali metal bisulfites or sulfites from their salts of inorganic acids.

It is another object of this invention to provide a method of the character described which is straight forward and conveniently carried out. These and other objects will become apparent in the following description of this invention.

According to the present invention there is provided a method which comprises reacting an organic carbonyl compound with sulfurous acid to produce the α-hydroxysulfonic acid corresponding to the carbonyl compound, reacting, in aqueous medium, said α-hydroxysulfonic acid with an alkali metal salt of an inorganic acid under conditions such that the alkali metal salt of the α-hydroxysulfonic acid is precipitated from the medium, separating the alkali metal salt of the α-hydroxysulfonic acid, and decomposing the alkali metal salt of the α-hydroxysulfonic acid under conditions such as to produce a compound selected from alkali metal sulfite and alkali metal bisulfite.

The sequence of operations of the process of the present invention may be illustrated by the following equations:

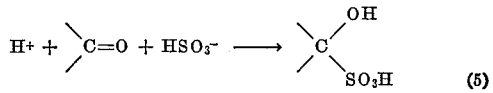
(5)

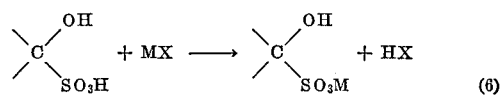
(6)

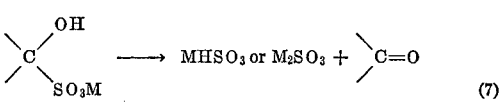
(7)

where M is the alkali metal and X is the anion of the inorganic acid.

The organic carbonyl compounds suitable for the practice of this invention are any of those capable of increasing the hydrogen ion in concentration of an aqueous sulfurous acid solution and forming, corresponding to the carbonyl compound, an α-hydroxysulfonic acid which is a highly reactive and strongly acidic water soluble complex sulfonic acid, and which complex sulfonic acid, under appropriate conditions, is capable of reacting simultaneously with an alkali metal salt of an inorganic acid to form a salt of the α-hydroxysulfonic acid, a complex sulfonate, crystallizable from solution.

In the practice of the invention, the preferred organic carbonyl compounds are those which do not contain any bulky substituents, because steric hindrance due to such substituents tends to inhibit the reactivity of the carbonyl groups towards bisulfite ion. Also preferred are those organic carbonyl compounds which conform to the above definition and contain electron attracting substituents and do not contain any electron releasing substituents, because the reactivity of the carbonyl compound depends on the efficient attack of the bisulfite ($HSO_3^-$) nucleophile on the carbon of the carbonyl group. Also preferred are those organic carbonyl compounds which do not undergo any loss by condensation reaction or oxidation by virtue of their great reactivity.

The carbonyl compounds which may be employed in the invention include acetone, cyclohexanone, benzaldehyde, salicylaldehyde, n-butyraldehyde, and chloroacetone. The preferred carbonyl compounds are acetone and cyclohexanone by reason of their cost, availability, stability and reactivity. The invention will hereinafter be described with particular reference to acetone and cyclohexanone but it will be understood that the invention is equally applicable to other carbonyl compounds.

The complex sulfonic acid is reacted with an alkali metal salt of an inorganic acid.

The invention is preferably applied to those alkali metal salts of inorganic acids stronger than sulfurous acid. Sulfurous acid in 0.1 N aqueous solution at 25° C. has a pH of about 1.5. At the same concentration and at the same temperature sulfuric acid has a pH of about 1.2 and hydrochloric acid a pH of about 1.1. The invention therefore has preferred applicability to alkali metal salts of sulfuric acid and hydrochloric acid, such as sodium chloride, potassium chloride, sodium sulfate, potassium sulfate, ammonium chloride and ammonium sulfate, although various other alkali metal salts can be used such as sodium and potassium nitrate. Such preferred materials are readily available and inexpensive. The invention is also applicable to various alkali metal phosphate salts such as sodium orthophosphate, potassium orthophosphate, disodium hydrogen phosphate, dipotassium hydrogen phosphate, diammonium hydrogen phosphate and ammonium dihydrogen phosphate.

The present invention provides a method of converting the salts to the corresponding bisulfite or sulfite for many uses, particularly in the pulp and paper industry. Sodium chloride is the preferred salt because of cost and usefulness of the corresponding bisulfite and sulfite. The present invention will be described hereinafter mainly with reference to sodium chloride but it is understood that it is equally applicable to other alkali metal salts of inorganic acids.

For the successful performance of the invention, the complex sulfonic acid must be allowed to react with an alkali metal salt such as sodium chloride under conditions such that the complex alkali metal sulfonate is sparingly soluble in the reaction medium and crystallizes therefrom. The complex sulfonate is freely soluble in water but has a limited solubility in organic solvents. The reaction medium should have the ability to dissolve sufficient sodium chloride for reaction with complex sulfonic acid. Sodium chloride has a very limited solubility in organic solvents but has a much higher solubility in mixtures of water with organic solvents, the solubility increasing with the water content of the solvent mixture. If the water content of the solvent mixture becomes too high, however, the complex sodium sulfonate becomes soluble in the reaction mixture, and fails to crystallize. Thus the reaction is preferably carried out in a mixture of water and an organic solvent of such composition that the sodium chloride has sufficient solubility to enter into the reaction, while the complex sodium sulfonate has a low enough solubility that it separates from the reaction mixture. In the practice of the invention, it is preferred to choose as the organic solvent, one carrying a reactive carbonyl function, so that the solvent serves the dual function of reacting with sulfurous acid to produce the complex sulfonic acid, and of adjusting the solubility relationships in the reaction mixture to the optimum value.

The solubility of the water soluble complex sulfonate decreases with decreasing temperature of the reaction mixture. Depending on the type of the carbonyl compounds used, and on the alkali metal salt of the inorganic acid used, the reaction temperature varies accordingly, because the complex sulfonates derived from different carbonyl compounds and derived from the different alkali metal salts have different solubilities in water. Thus, in the practice of the invention, the preferred reaction temperature for sodium chloride-acetone-sulfur dioxide-water system is below 10° C., preferably about 0° C., and for the sodium chloride-cyclohexanone-sulfur dioxide-water system, a temperature below 35° C., preferably about 20° C.

The overall reactions involved in the formation of the intermediate complex sulfonate in this invention may be represented by Equation 8, with sodium chloride as the alkali metal salt:

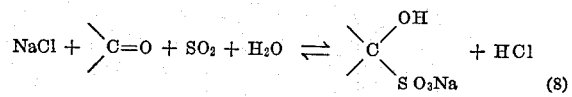

(8)

It is evident that in order that the equilibrium reaction (8) might proceed to the right, the concentrations of the carbonyl compound and the sulfurous acid or in other words, the concentration of complex sulfonic acid must be in excess of that needed stoichiometrically to react with sodium chloride to be consumed in the performance of the invention. It can also be seen that hydrochloric acid is a by-product of the equilibrium reaction (8) and that accumulation of hydrochloric acid in the reaction products unless otherwise removed would tend to reverse the course of the reaction by decomposing the complex sulfonate, and is therefore one of the factors determining the yield of the complex sulfonate at equilibrium. Also, any sodium chloride used in excess of the amount consumed at equilibrium does not react, but contaminates the complex sulfonate, and is therefore not preferred in the practice of the invention.

In the performance of the invention, the complex sodium sulfonate is separated by filtration, preferably washed free of chloride and is then subjected to decomposition by heat treatment in order to regenerate the reactive carbonyl compound. The product of the decomposition may be sodium bisulfite or sodium sulfite, depending on the conditions of the heat treatment. Solution decomposition by distilling an aqueous solution of the complex sulfonate at substantially atmospheric pressure favours the formation of sodium bisulfite. Thermal decomposition of the complex sulfonate in the solid state in the presence of an inert atmosphere such as steam favours the formation of sodium sulfite. The temperature of the thermal decomposition may be between 125° C. and 200° C. The thermal decomposition is carried out in the substantial absence of oxygen so as to prevent formation of undesirable amounts of sodium sulfate.

Because of differences in the water solubility of the complex sulfonates derived by reacting different carbonyl compounds with sodium chloride, and also because of the solubility differences of the complex sulfonates derived by reacting the same carbonyl compound with the different alkali metal salts, and particularly because of the difference in reactivity amongst different carbonyl compounds towards bisulfite ion, and also because of the difference in reactivity amongst different salts towards complex sulfonic acid, it is evident that the exact reaction conditions for optimum results in the performance of the invention, particularly the reactant compositions, and more particularly the reaction temperature will depend on the choice of the carbonyl compound and salt to be used in such performance.

In the practice of the present invention, the reaction between the organic carbonyl compound and the sulfurous acid and the reaction between the resulting α-hydroxysulfonic acid and the alkali metal salt of the inorganic acid may be carried out either sequentially or simultaneously. In the simultaneous operation, sulfur dioxide gas may be added to an aqueous medium containing the alkali metal salt of the inorganic acid and the carbonyl compound, or, alternatively, an initial solution of sulfur dioxide in carbonyl compound may be prepared and added to an aqueous medium containing the alkali metal salt of the inorganic acid. In the sequential operation, sulfur dioxide gas may be added to a mixture of the carbonyl compound and water and the resulting α-hydroxysulfonic acid is added to an aqueous medium containing the alkali metal salt of the inorganic acid.

The invention will now be further described by way of example, with reference to the accompanying drawings, in which.

Figure 1:
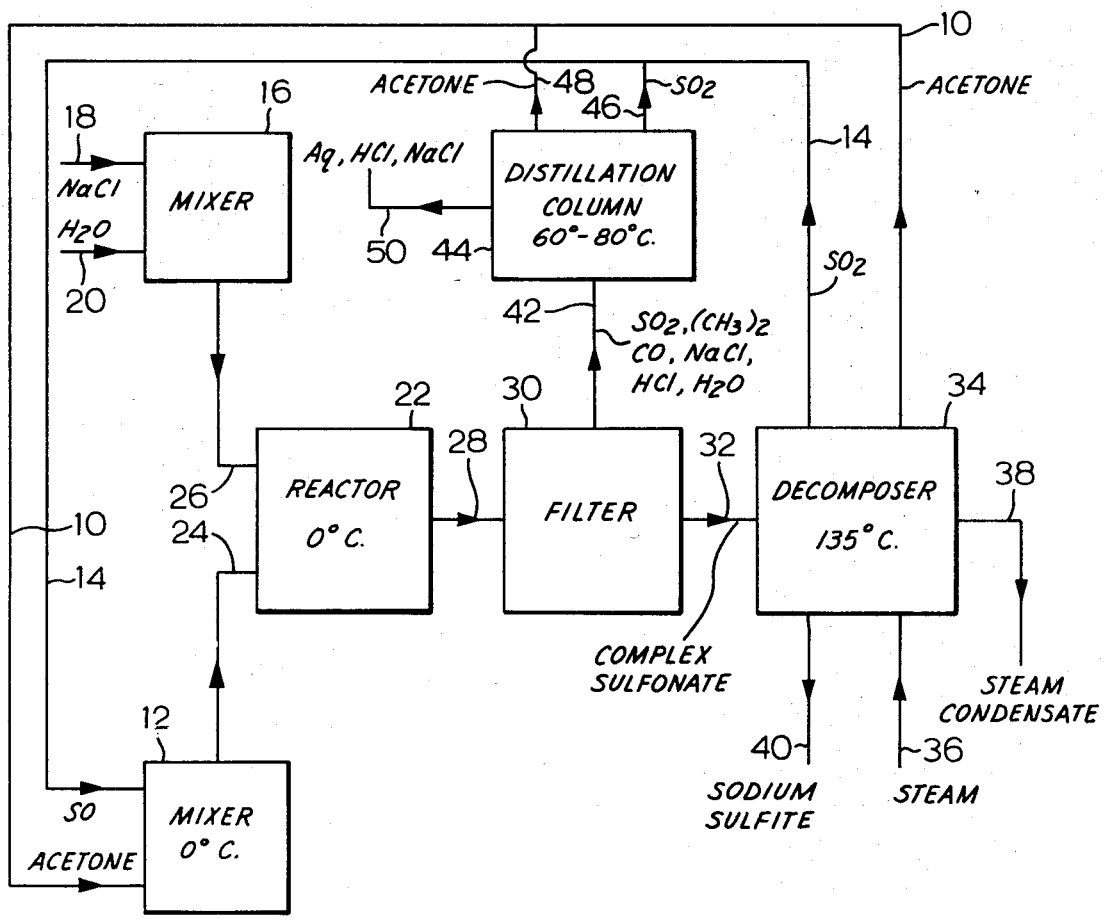
FIG. 1 represents a simplified flow diagram which illustrates the application of this invention to making sodium sulfite from sodium chloride using acetone at 0° C.

Referring now to FIG. 1, through line 10, there is fed commercial acetone into a mixer 12, the temperature of which is maintained at 0° C. Sulfur dioxide is then fed into the mixer through line 14. In a separate mixer 16, there are fed sodium chloride and water through lines 18 and 20 respectively. The acetone-sulfur dioxide solution from mixer 12 and aqueous solution of sodium chloride from mixer 16 are then fed into a reactor 22 through lines 24 and 26 respectively. The temperature in the reactor is maintained at 0° C. and the contents in the reactor are constantly agitated for 24 hours, after which period, the contents from the reactor are passed through line 28 to a filter 30. The solid complex sodium sulfonate is filtered out at this stage and is fed via line 32 into a decomposer 34, kept at a temperature of 135° C. Steam is introduced into decomposer through line 36, and the sulfur dioxide and acetone generated during the thermal decomposition of the complex sodium sulfonate is recycled through lines 10 and 14 respectively to the mixer 12. Steam condensate from decomposer 34 is discharged through line 38. Pure sodium sulfite is withdrawn from decomposer 34 through line 40 to storage.

The filtrate from the filter 30 containing acetone, sulfur dioxide, sodium chloride, hydrochloric acid and water is passed through line 42 to a distillation column 44. As the redistillation column is operating at a kettle temperature between 60° C. and 80° C. at atmospheric pressure, both sulfur dioxide and acetone are distilled overhead and are recycled to the mixer 12 through lines 46 and 48 respectively. Aqueous hydrochloric acid with small amounts of unreacted sodium chloride is withdrawn from the distillation column through line 50.

Figure 2:
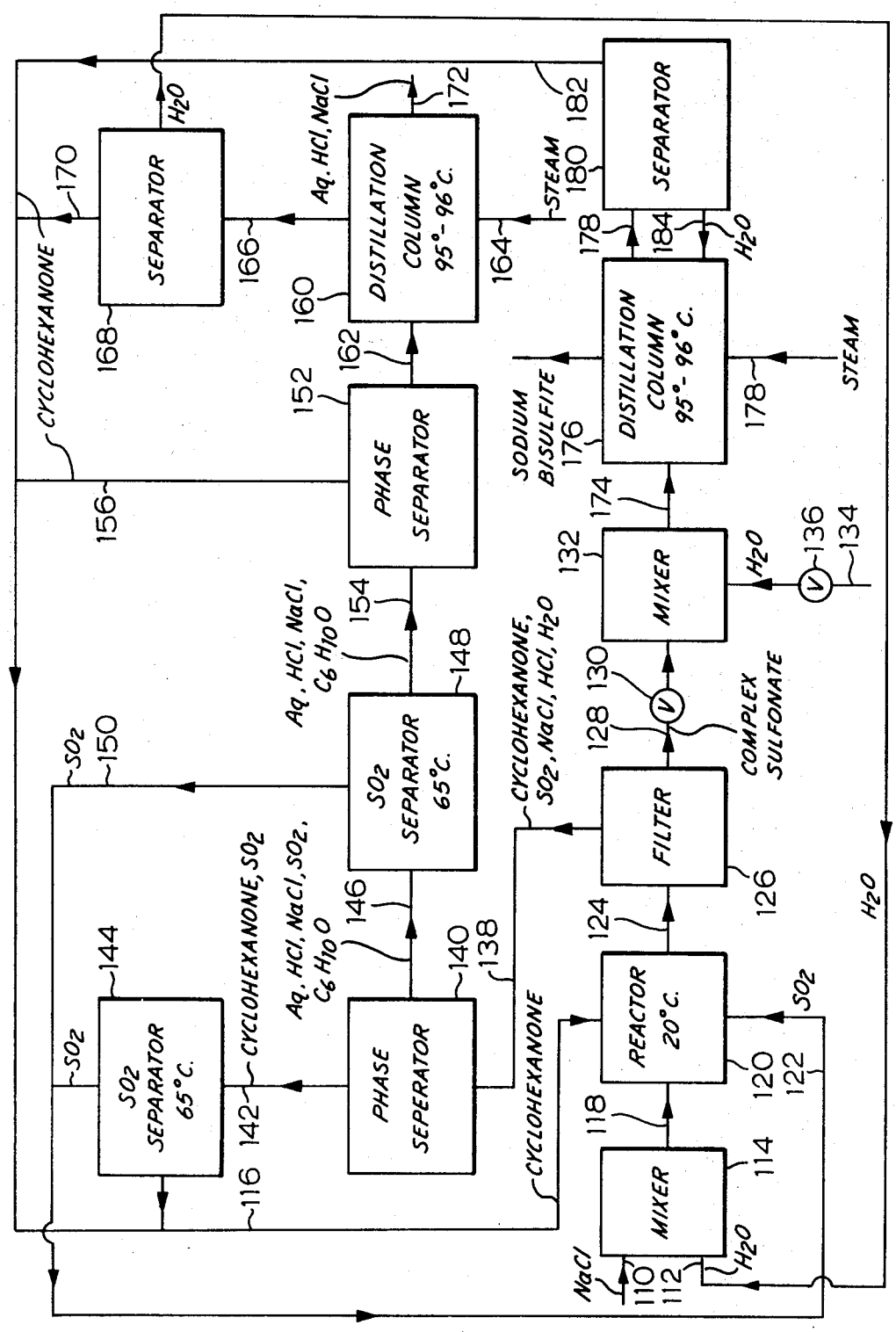
FIG. 2 represents a simplified flow diagram which illustrates the application of this invention to making sodium bisulfite from sodium chloride using cyclohexanone at 20° C.

Referring now to FIG. 2, through lines 110 and 112 sodium chloride and water are fed respectively into a mixer 114, where an aqueous solution of sodium chloride is formed. Then through lines 116 and 118, there are fed into a reactor 120, commercial cyclohexanone and the aqueous solution of sodium chloride, respectively, when a heterogenous mixture is formed in the reactor. Through line 122, sulfur dioxide is then introduced in the reactor 120 for 30 minutes, maintaining the temperature in the reactor at 20° C., after which period, the contents from the reactor are fed through line 124 to a filter 126. The solid complex sodium sulfonate is filtered out at this stage, is then passed via line 128, valve 130 open, to mixer 132. Water is introduced to mixer 132 through line 134, with valve 136 open and the solid complex sulfonate is then dissolved in water. The filtrate from the filter 126 containing cyclohexanone, sulfur dioxide, sodium chloride, hydrochloric acid and water is passed through line 138 to a phase separator 140, where two phases comprising a cyclohexanone rich top and an aqueous rich bottom layer are separated. The top phase from separator 140 is introduced through line 142 to a sulfur dioxide separator 144, where, by a mild heat treatment at 65° C., sulfur dioxide and cyclohexanone are separated and are recycled separately through lines 122 and 116 respectively to the reactor 120. The aqueous rich bottom phase from separator 140 is similarly introduced to another sulfur dioxide separator 148 via line 146, where by mild heat treatment at 65° C., sulfur dioxide is stripped off from separator 148 and is recycled to the reactor 120 via lines 150 and 122. The aqueous phase from separator 148 after sulfur dioxide has been stripped off is introduced to another phase separator 152 through line 154, where the cyclohexanone separates in the top phase and is recycled in the reactor 120 via lines 156 and 116. The aqueous phase, still containing small quantities of dissolved cyclohexanone, is then passed to distillation column 160 through line 162. Steam is introduced through line 164 into the distillation column. As the distillation column is operating at 95–96° C. at atmospheric pressure, the water and cyclohexanone are azeotropically distilled overhead through line 166 to separator 168. Cyclohexanone is separated from water in separator 168 and removed through line 170 for recycling to the reactor 120, while the water is withdrawn from separator 168 and is then recycled to the mixer 114 through line 112. Aqueous hydrochloric acid solution with unreacted sodium chloride is withdrawn from distillation column 160 through line 172.

The aqueous solution of the complex sodium sulfonate from the mixer 132 is passed via line 174 to distillation column 176. Steam is introduced through line 178 into the distillation column. As the distillation column 176 is operating at 95–96° C. at atmospheric pressure, the complex sodium sulfonate breaks down, and water and cyclohexanone are azeotropically distilled overhead through line 178 to separator 180. Cyclohexanone is separated from the water in separator 180 and removed through line 182 for recycling to the reactor 120, while the water is withdrawn from separator 180 through line 184, and is then recycled to the kettle of the distillation column 176. Aqueous sodium bisulfite is withdrawn from distillation column 176 through line 186 to storage.

The invention is illustrated by the following examples:

EXAMPLE I 10 grams of sulfur dioxide was dissolved in 35 millilitres of commercial acetone cooled to 0° C., and the resulting acetone-sulfur dioxide solution was then added to a solution of 3.75 grams of sodium chloride dissolved in 15 millilitres of water. The solution was cooled to 0° C., and constantly agitated for 24 hours at that temperature. The crystals of complex sodium sulfonate so formed were then filtered off, dried and weighed. 9.0 grams of pure complex sodium sulfonate represented a yield of 87.5% based on the amount of sodium chloride used. The filtrate after separation of the complex sodium sulfonate was subjected to batch distillation at a kettle temperature between 60° C. and 80° C. for 1 hour at atmospheric pressure, when sulfur dioxide and acetone distilled off, while hydrochloric acid and the unreacted sodium chloride remained in the aqueous still residue from such distillation.

The complex sulfonate was then thermally degraded at a temperature of 135° C. in an atmosphere of steam, when acetone and $SO_2$ distilled off leaving behind pure sodium sulfite in a yield of 88% of the theoretical.

EXAMPLE II

Mixtures of acetone, water, sulfur dioxide and sodium chloride were held for 24 hours at various temperatures, the crystalline complex sodium sulfonate product filtered off, dried and weighed. In each experiment the amount of sodium chloride used was the maximum which would react under the experimental conditions specified, to give a chloride free product.

The results obtained are reproduced in the following Table I.

TABLE I

| Composition of reaction mixture | | | | Crystal- lisation Tempera- ture, ° C. | Yield of complex sodium sulfonate | |
|---|---|---|---|---|---|---|
| Acetone, ml. | Water, ml. | $SO_2$, g. | NaCl, g. | | Gram | Percent of theoretical |
| 80 | 20 | 30 | 2.38 | 15 | 4.50 | 68.3 |
| 70 | 30 | 30 | 3.50 | 15 | 5.40 | 55.7 |
| 60 | 40 | 30 | 4.26 | 15 | 3.74 | 31.6 |
| 80 | 20 | 30 | 2.67 | 0 | 6.68 | 90.4 |
| 70 | 30 | 30 | 4.05 | 0 | 9.99 | 89.0 |
| 60 | 40 | 30 | 4.69 | 0 | 10.85 | 83.5 |

It can be seen from these data that yields of complex sodium sulfonate are around 50% at 15° C., and nearly 90% at 0° C. The amount of sodium chloride which can be converted is a function of the water content of the reaction mixture, increasing with increasing water content. The percentage yield based on sodium chloride consumed decreases with increasing water content of the reaction mixture as a consequence of increasing solubility of the product. At 0° C. the yield of product per volume of reaction mixture increases, and the yield of product based on sodium chloride used decreases with increasing water content of reaction mixture.

EXAMPLE III

Mixtures of aqueous acetone 70% by volume with sulfur dioxide and sodium chloride were maintained at 0° C. for 24 hours and the crystalline complex sodium sulfonate product collected, dried and weighed. The results are shown in the following Table II.

TABLE II

| Composition of reaction mixture | | | | Yield of complex sodium sulfonate | |
|---|---|---|---|---|---|
| Acetone, ml. | Water, ml. | $SO^2$, g. | NaCl, g. | Grams | Percent theoretical yield* |
| 70 | 30 | 12.8 | 3.87 | 9.47 | 88.0 |
| 70 | 30 | 20.0 | 3.81 | 9.54 | 90.2 |
| 70 | 30 | 40.0 | 4.18 | 10.12 | 87.5 |

*Based on amount of sodium chloride used.

EXAMPLE IV

Weighed samples of the complex sulfonate product produced according to the process of Example I were heated for 15 minutes at various temperatures in an atmosphere of steam. The sulfur dioxide evolved was trapped and oxidised to sulfate in 5% hydrogen peroxide solution. The weight of the residue was determined and the content of sodium sulfite determined by iodometry. The results are reproduced in the following Table III.

TABLE III

| Temperature, ° C. | Residue, wt.* | $Na_2SO_3$, wt.* | $SO_2$ evolved, wt.* |
|---|---|---|---|
| 135 | 40.8 | 34.3 | 16.9 |
| 150 | 39.3 | 34.1 | |
| 200 | 39.7 | 33.6 | 16.8 |
| 215 | 39.5 | 33.3 | |
| 250 | 40.0 | 31.9 | |
| Theoretical | 39.0 | 39.0 | 19.7 |

* G./100 g. of complex sodium sulfonate.

These data show that sodium sulfite is obtained in about 88% yield from thermal decomposition of the complex sodium sulfonate product.

EXAMPLE V

A 15% aqueous solution of the complex sodium sulfonate product produced according to the process of Example I was distilled slowly over a 2 hour period at atmospheric pressure to give a product which was predominantly sodium bisulphite. Distillate consisting mainly of acetone and residue were analysed for sulfur dioxide, free or combined, by iodometry, and for acetone by means of the iodoform reaction. The results are reproduced in the following Table IV.

TABLE IV

| | Acetone * | $SO_2$* |
|---|---|---|
| Initial composition | 36.0 | 36.1 |
| Distillate composition | 36.0 | 3.92 |
| Residue composition | Nil | 33.0 |

* G./100 g. of complex sulfonate.

These data show that decomposition under the mild conditions of distillation of an aqueous solution gives predominantly sodium bisulfite as the product, along with quantitative recovery of acetone in the distillate.

EXAMPLE VI

In a qualitative study, using various alkali metal salts of inorganic acids, a mixture of alkali metal salt of inorganic acid, acetone, sulfur dioxide and water was maintained at 0° C. for 24 hours, and the crystalline complex sulfonate product filtered off, dried and weighed. The results are shown in the following Table V.

TABLE V

| Type of salts | Salt, g. | Acetone, g. | Water, g. | $SO_2$, g. | Yield of crude complex sulfonate, g. |
|---|---|---|---|---|---|
| $NaNO_3$ | 3.0 | 25 | 25 | Saturation | 2.2 |
| $Na_2SO_4$ | 3.0 | 25 | 25 | ___do___ | 3.2 |
| $Na_3PO_4$ | 3.0 | 25 | 25 | ___do___ | 2.2 |
| KCl | 3.0 | 25 | 25 | ___do___ | 2.2 |

These data show the applicability of the present invention to sodium nitrate, sodium sulfate, sodium phosphate and potassium chloride. The complex sulfonate is decomposed to form the alkali metal sulfite or bisulfite in the manner described in Examples I or V.

EXAMPLES VII

To a solution of 12 grams of sodium chloride dissolved in 100 millilitres of water, was added 100 grams of cyclohexanone, forming a heterogenous mixture. Sulfur dioxide was then slowly bubbled into the mixture with stirring, and the temperature rose from 25° C. to about 55° C. The resulting homogenous solution was then cooled to 20° C., and maintained at that temperature for thirty minutes with continuous addition of sulfur dioxide and constant agitation of the mixture. During cooling down from 55° C., the complex sodium sulfonate started to form at 35° C., and at 20° C. the reaction mixture turned into a thick slurry. Total amount of sulfur dioxide added was 64 grams.

The viscous slurry was then filtered, and the complex sodium sulfonate product dried and weighed. 34 grams of pure complex sulfonate product represented a yield of 84.5% based on the amount of sodium chloride used. The filtrate after separation of the complex sulfonate separated into two layers—the cyclohexanone rich top layer containing sulfur dioxide, and the aqueous rich bottom layer containing sulfur dioxide, cyclohexanone, the by-product hydrochloric acid and also unreacted sodium chloride. The bottom layer was first stripped of its sulfur dioxide content by heating at 65° C. for 1 hour; the additional cyclohexanone layer produced by this heat treatment was separated, and then the aqueous fraction azeotropically distilled at 96–98° C. under atmospheric pressure in presence of steam as carrier gas, at which time the remaining cyclohexanone was recovered overhead to give an overall cyclohexanone recovery of 99.8%, and the aqueous still residue contained the by-product hydrochloric acid and the unreacted sodium chloride.

Next, the complex sulfonate in water was stream distilled under reflux. 100 millilitres of a 10% solution of the complex sulfonate in water was refluxed at 100° C. for 1 hour, and then steam distilled for 15 minutes at 96–98° C. under atmospheric pressure, when cyclohexanone was recovered overhead in 30 ml. of azeotrope distillate representing a yield of 99.9% of the theoretical. The residue left in the still was an aqueous solution of sodium bisulfite. The kettle temperature during the distillation was held constant at 100° C.

EXAMPLE VIII

In a qualitative study, using various alkali metal salts of inorganic acids, into a mixture of alkali metal salt of inorganic acid, cyclohexanone and water maintained at 20° C., sulfur dioxide gas was passed for 30 minutes, and the crystalline complex sulfonate product so formed was filtered off, dried and weighed. The results are reproduced in Table IV.

TABLE VI

| Type of salts | Salts, g. | Cyclohexanone, g. | Water, g. | $SO_2$, g. | Yield of crude complex sulfonate, g. |
|---|---|---|---|---|---|
| $NaNO_3$ | 3.0 | 25 | 25 | Saturation | 2.4 |
| $Na_2SO_4$ | 3.0 | 25 | 25 | ---do--- | 4.8 |
| $Na_3PO_4$ | 3.0 | 25 | 25 | ---do--- | 3.0 |
| $K_2SO_4$ | 3.0 | 25 | 25 | ---do--- | 5.1 |
| $KCl$ | 3.0 | 25 | 25 | ---do--- | 6.3 |
| $KNO_3$ | 3.0 | 25 | 25 | ---do--- | 2.8 |
| $K_2HPO_4$ | 3.0 | 25 | 25 | ---do--- | 5.2 |

These data show the applicability of the present invention to various alkali metal salts. The complex alkali metal sulfonate can be converted to the alkali metal sulfite or bisulfite by the treatment of Examples I or VII.

EXAMPLE IX

In a qualitative study, using various ammonium salts of inorganic acids, a mixture of ammonium salt of inorganic acid, cyclohexanone, sulfur dioxide and water was maintained at 5° C. for 16 hours, and the crystalline product filtered off, dried and weighed. The results are reproduced in the following Table VII.

TABLE VII

| Type of salts | Salt, g. | Cyclohexanone, g. | Water, g. | $SO_2$, g. | Yield of crude complex sulfonate, g. |
|---|---|---|---|---|---|
| $NH_4Cl$ | 3.00 | 25 | 25 | 30.8 | 1.90 |
| $(NH_4)_2SO_4$ | 6.80 | 25 | 25 | 31.4 | 8.95 |
| $NH_4H_2PO_4$ | 5.90 | 25 | 25 | 29.3 | 0.70 |
| $(NH_4)_2HPO_4$ | 6.80 | 25 | 25 | 18.6 | 7.20 |

These data show the applicability of the invention to ammonium salts of inorganic acids. The complex sulfonate may be converted to the ammonium sulfite or bisulfite by the processes described in Examples I and VII.

EXAMPLE X

In a qualitative study, using various carbonyl compounds, a mixture of carbonyl compound, sodium chloride, sulfur dioxide and water was maintained at 5° C. for 24 hours, and the crystalline product filtered off, dried and weighed. The results are reproduced in the following Table VIII.

TABLE VIII

| Type of carbonyl compounds | Carbonyl, g. | NaCl, g. | $H_2O$, g. | $SO_2$, g. | Yield of crude complex sulfonate, g. |
|---|---|---|---|---|---|
| Benzaldehyde | 25 | 3.0 | 25 | 13.0 | 10.0 |
| Salicylaldehyde | 25 | 3.0 | 25 | 18.0 | 16.7 |
| Formalin | 25 | 3.0 | 25 | Saturation | 3.3 |
| Chloro acetone | 25 | 3.0 | 25 | ---do--- | 5.4 |
| n-Butyraldehyde | 25 | 3.0 | 25 | 14.0 | 1.7 |

These data show the applicability of the invention to various organic carbonyl compounds.

It should be understood, however, that the examples and the flow diagrams described above are only meant to be illustrative and not limiting, and variations and modifications are possible within the scope of the foregoing disclosure.

What we claim is:

1. A method which comprises reacting an organic carbonyl compound with sulfurous acid to produce the α-hydroxysulfonic acid corresponding to the carbonyl compound, reacting the α-hydroxysulfonic acid with an alkali metal salt of an inorganic acid in a reaction medium consisting of a mixture of water and an organic solvent whereby the alkali metal salt of the α-hydroxysulfonic acid is precipitated from the medium, separating the alkali metal salt of the α-hydroxysulfonic acid, and decomposing the alkali metal salt of the α-hydroxysulfonic acid under conditions such as to produce a compound selected from the group consisting of alkali metal sulfites and alkali metal bisulfites.

2. The method of claim 1 wherein said carbonyl compound is free from bulky substituents.

3. The method of claim 1 wherein said carbonyl compound is free from bulky substituents and nucleophilic groups.

4. The method of claim 1 wherein said carbonyl compound is selected from acetone and cyclohexanone.

5. The method of claim 1 wherein said alkali metal salt of an inorganic acid is an alkali metal salt of an acid which has pH in an 0.1 N aqueous solution at 25° C. of less than about 1.5.

6. The method of claim 1 wherein said alkali metal salt of an inorganic acid is an alkali metal salt of an acid selected from hydrochloric acid and sulfuric acid.

7. The method of claim 1 wherein said alkali metal salt of an inorganic acid is selected from sodium, potassium and ammonium salts of an acid selected from hydrochloric acid and sulfuric acid.

8. The method of claim 1 wherein said alkali metal salt of an inorganic acid is sodium chloride.

9. The method of claim 1 wherein said alkali metal salt of an inorganic acid is potassium chloride.

10. The method of claim 1 wherein said alkali metal salt of an inorganic acid is sodium sulfate.

11. The method of claim 1 wherein said alkali metal salt of an inorganic acid is sodium orthophosphate.

12. The method of claim 1 wherein said alkali metal salt of an inorganic acid is sodium orthophosphate.

13. The method of claim 1 wherein said alkali metal salt of an inorganic acid is disodium monohydrogen phosphate.

14. The method of claim 1 wherein said alkali metal salt of an inorganic acid is dipotassium monohydrogen phosphate.

15. The method of claim 1 wherein said carbonyl compound is acetone, the alkali metal salt of the inorganic acid is sodium chloride and the α-hydroxysulfonic acid is reacted with alkali metal salt in an aqueous medium at a temperature below 10° C. to form the sodium salt of the α-hydroxysulfonic acid.

16. The method of claim 15 wherein the temperature is about 0° C.

17. The method of claim 1 wherein said carbonyl compound is cyclohexanone, the alkali metal salt of the inorganic acid is sodium chloride and the α-hydroxysulfonic acid is reacted with the alkali metal salt in an aqueous medium at a temperature of below 35° C. to form the sodium salt of the α-hydroxysulfonic acid.

18. The method of claim 17 wherein the temperature is about 20° C.

19. The method of claim 1 wherein sulfur dioxide gas is added to an aqueous medium containing the alkali metal salt of the inorganic acid and the carbonyl compound.

20. The method of claim 1 wherein a solution of sulfur dioxide in the carbonyl compound is added to an aqueous medium containing the alkali metal salt of the inorganic acid.

21. The method of claim 15 wherein the sodium salt of the α-hydroxysulfonic acid is decomposed at a temperature of from 125° to 200° C. in an inert atmosphere.

22. The method of claim 17 wherein the sodium salt of the α-hydroxysulfonic acid is decomposed at a temperature of from 125° to 200° C. in an inert atmosphere.

23. The method of claim 15 wherein the sodium salt of the α-hydroxysulfonic acid is decomposed by boiling an aqueous solution thereof at atmospheric pressure.

24. The method of claim 17 wherein the sodium salt of the α-hydroxysulfonic acid is decomposed by boiling an aqueous solution thereof at atmospheric pressure.

References Cited
UNITED STATES PATENTS

| | | | |
|---|---|---|---|
| 2,736,635 | 2/1956 | Haywood | 23—129 |
| 2,913,309 | 11/1959 | Sanborn et al. | 23—129 |
| 3,248,278 | 4/1966 | Wilson | 23—129X |
| 3,441,376 | 4/1969 | Anderson | 23—129 |

EARL C. THOMAS, Primary Examiner

G. O. PETERS, Assistant Examiner

U.S. Cl. X.R.

23—130